US008228601B2

(12) United States Patent
Meshulach et al.

(10) Patent No.: US 8,228,601 B2
(45) Date of Patent: Jul. 24, 2012

(54) SCANNING MICROSCOPY USING INHOMOGENEOUS POLARIZATION

(75) Inventors: Doron Meshulach, Ramat Gan (IL); Kobi Kan, Tel-Aviv (IL); Haim Feldman, Nof-Ayalon (IL); Ido Dolev, Manof (IL); Ori Sarfaty, Ramat Hasharon (IL)

(73) Assignee: Applied Materials Israel, Ltd., Rehovot (IL)

( * ) Notice: Subject to any disclaimer, the term of this patent is extended or adjusted under 35 U.S.C. 154(b) by 465 days.

(21) Appl. No.: 12/464,761

(22) Filed: May 12, 2009

(65) Prior Publication Data
US 2009/0284835 A1    Nov. 19, 2009

Related U.S. Application Data

(60) Provisional application No. 61/052,967, filed on May 13, 2008.

(51) Int. Cl.
G02B 27/28    (2006.01)

(52) U.S. Cl. ......................................................... 359/386

(58) Field of Classification Search .................. 359/386, 359/371
See application file for complete search history.

(56) References Cited

U.S. PATENT DOCUMENTS

| 5,260,569 | A * | 11/1993 | Kimura | 250/234 |
|---|---|---|---|---|
| 2005/0195480 | A1 | 9/2005 | Brown et al. | |
| 2006/0007541 | A1 | 1/2006 | Totzeck et al. | |
| 2006/0238865 | A1 * | 10/2006 | Biss et al. | 359/487 |
| 2006/0268265 | A1 | 11/2006 | Chuang et al. | |
| 2006/0274408 | A1 * | 12/2006 | Lauer | 359/386 |
| 2007/0109546 | A1 * | 5/2007 | Meshulach et al. | 356/445 |
| 2007/0115551 | A1 | 5/2007 | Spilman et al. | |
| 2007/0159694 | A1 | 7/2007 | Brown et al. | |
| 2007/0171519 | A1 * | 7/2007 | Wolleschensky | 359/385 |
| 2008/0116362 | A1 * | 5/2008 | Feldman et al. | 250/237 R |

OTHER PUBLICATIONS

Youngworth, K.S. and Brown, T.G; Inhomogeneous Polarization in Scanning Optical Microscopy, Proceedings of SPIE, col. 3919, 2000, pp. 75-85.
"Annular pupils, radial polarization, and superresolution", Colin J. R. Sheppard and Amarjyoti Choudhury, Applied Optics, vol. 43, No. 22, pp. 4322-4327 (2004).
"A high fidelity approximation of radial polarization conversion", P.B. Phua, W.J. Lai, and Yuan Liang Lim, submitted to arXiv Oct. 2007 and available through Cornell University Library.

(Continued)

*Primary Examiner* — Mark Consilvio
(74) *Attorney, Agent, or Firm* — Tarek N. Fahmi, APC (57) ABSTRACT

Apparatus for imaging a surface, including an acousto-optic (AO) system. The AO system includes an AO element having a radiation input surface and a radiation output surface. The element is configured to receive radio-frequency (RF) pulses and a radiation input at the radiation input surface and to generate traveling beams from the radiation output surface. The AO system also includes an inhomogeneous polarization generator, positioned relative to the AO element so that the AO system outputs traveling inhomogeneously polarized beams. The apparatus includes objective optics which are configured to focus the inhomogeneously polarized beams onto the surface so as to form respective traveling spots thereon; collection optics, which are configured to collect scattered radiation from the traveling spots and to focus the scattered radiation to form respective image spots; and a detector which is arranged to receive the respective image spots and to generate a signal in response thereto.

22 Claims, 9 Drawing Sheets

OTHER PUBLICATIONS

"Vector propagation of radially polarized Gaussian beams diffracted by an axicon", Yaoju Zhang, Ling Wang, and Chongwei Zheng, Josa A, vol. 22, issue 11, pp. 2542-2546 (2005.

"Sharper Focus for a Radially Polarized Light Beam", R. Dorn, S. Quabis, and G. Leuchs, Physical Review Letters, vol. 91 No. 23, pp. 233901-1-233901-4 (2003).

* cited by examiner

SCANNING MICROSCOPY USING INHOMOGENEOUS POLARIZATION

CROSS-REFERENCE TO RELATED APPLICATIONS

This application claims priority of U.S. Provisional Patent Application Ser. No. 61/052,967, filed 13 May 2008, the disclosure of which is incorporated herein by reference in its entirety.

FIELD OF THE INVENTION

The present invention relates generally to imaging an object, and specifically to imaging the object using particular types of polarized radiation.

BACKGROUND OF THE INVENTION

Imaging objects using polarized radiation is well known. Types of polarized radiation that are used for the imaging include linearly polarized and elliptically polarized radiation. Methods for producing other types of polarized radiation are known.

U.S. Patent Applications 2007/0159694 and 2005/0195480 to Brown et al., which are incorporated herein by reference, describe a system for converting homogeneously polarized radiation to inhomogeneously polarized radiation using a combination of isotropic and anisotropic media.

U.S. Patent Application 2007/0115551 to Spilman et al., which is incorporated herein by reference, describes a system for converting homogeneously polarized radiation to inhomogeneously polarized radiation using a spatially variant waveplate.

U.S. Patent Application 2006/0268265 to Chuang et al., which is incorporated herein by reference, describes a method for inspection of a sample. The method uses an illumination mode which "uses pure p-polarization, also called radial polarization because the electric field oscillates radially about the Z axis in a manner similar to spokes in a wheel."

U.S. Patent Application 2006/0238865 to Biss et al., which is incorporated herein by reference, describes producing an inhomogeneously polarized optical beam from a homogeneous beam using two phase shifters and a polarization beam splitter. The disclosure also describes using the inhomogeneous beams for imaging.

U.S. Patent Application 2006/0007541 to Totzeck et al., which is incorporated herein by reference, describes an optical imaging inspection system. One arrangement of the system uses a radial polarizer.

An article titled "Inhomogeneous Polarization in Scanning Optical Microscopy" to Youngworth et al. Proceedings of SPIE Vol. 3919 (2000) is incorporated herein by reference. The article describes a scanning laser microscope using an azimuthally polarized beam.

Notwithstanding the present art, an improved imaging system using polarized radiation would be advantageous.

SUMMARY OF THE INVENTION

In an embodiment of the present invention, an imaging microscope has an acousto-optic (AO) system that is configured to generate traveling inhomogeneously polarized beams, each of which has the property that its direction of polarization exhibits circular symmetry about a propagation axis of the beam. Objective optics focus the beams onto a surface, so as to form respective traveling spots on the surface. Collection optics collect radiation produced from the beams focused on the surface and focus the collected radiation to image spots. A detector receives the image spots and generates a signal from the spots.

The inhomogeneously polarized beams may be radially polarized or tangentially polarized. At the beam focus, the component of the electric vector in a plane orthogonal to the beam propagation axis vanishes, but grows with distance from the focus. If the inhomogeneously polarized beam is radially polarized, the electric vector at the surface is orthogonal to the surface. This causes the signal produced from the surface to be typically significantly different from that produced for homogeneously polarized beams, and the differences may be used to improve inspection of the surface.

The microscope may be a reflection microscope, in which case the objective and collection optics may have some common components. Alternatively, the microscope may be a transmission microscope, in which case the objective and collection optics are distinct.

The present invention will be more fully understood from the following detailed description of the embodiments thereof, taken together with the drawings, a brief description of which follows.

DETAILED DESCRIPTION OF EMBODIMENTS

Figure 1:
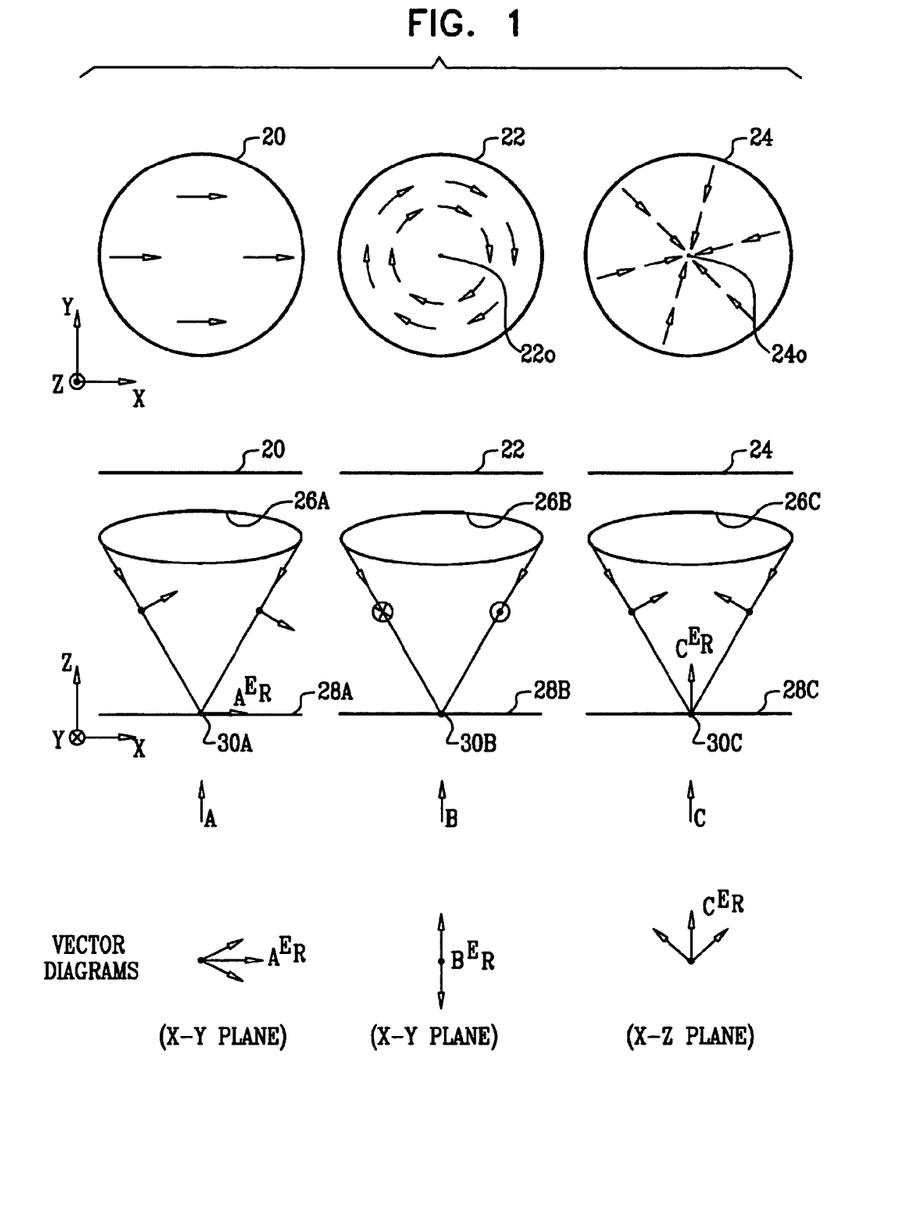
FIG. 1 schematically illustrates different types of polarization, according to an embodiment of the present invention.

Reference is now made to FIG. 1, which schematically illustrates different types of polarization, according to an embodiment of the present invention. A set "A" of diagrams corresponds to linear polarization, a set "B" of diagrams corresponds to tangential polarization, and a set "C" of diagrams corresponds to radial polarization. In each set a round flat polarizer is assumed to receive a radiation beam, and the polarizer is followed by a lens 26A, 26B, or 26C which focuses the radiation beam exiting from the polarizer onto a respective surface 28A, 28B, or 28C. For simplicity, the received radiation beam is not shown in FIG. 1. All the diagrams are referenced to an orthogonal set of x, y, z axes.

In set "A" a linear polarizer 20, typically a sheet of Polaroid™, receives a non-polarized radiation beam travelling in the negative z direction. Polarizer 20 is assumed to linearly polarize the radiation beam parallel to the x-direction, this direction corresponding to the direction of the electric vector of the radiation exiting from the polarizer. The linearly polarized radiation produced by polarizer 20 is also termed homogeneously polarized radiation, wherein the electric vector direction of all rays exiting the polarizer have the same direction. The magnetic vector of the radiation exiting from the polarizer is in the y-direction. In the diagrams, for simplicity only the directions of the electric vectors are shown. As necessary, those having ordinary skill in the art will be able to determine the directions of the magnetic vectors since the magnetic vectors are orthogonal to the electric vectors and to the direction of travel of the radiation, and since the three vectors form a right-handed set of orthogonal vectors.

Other methods for generating linearly polarized radiation are well known in the art. For example, the beam produced by many lasers is linearly polarized.

Lens 26A focuses the linearly polarized radiation beam to a spot 30A on surface 28A. The electric vectors of the radiation at spot 30A add to give a resulting electric vector $_A E_R$ having a direction that is parallel to the x-direction, as shown in the diagram.

In set "B" a tangential polarizing plate 22, also herein termed a tangential polarizer, receives a radiation beam travelling in the negative z direction. Tangential polarizer 22 is a first type of inhomogeneous polarizer, having the characteristic that the directions of the electric vectors of radiation exiting the polarizer are perpendicular to radii of the polarizer, the radii having a common central point 22o in the polarizer. Tangential polarizers are known in the art.

For example, Nanophoton Corp. of Osaka University, Osaka 565-0871, Japan, produce a "ZPol" polarizer, which receives linear polarized radiation and, with a specific orientation of the ZPol polarizer relative to the received radiation, is able to generate tangential, or azimuthal, polarization. Arcoptix S.A of Neuchâtel, Switzerland produce a "Radial Polarization Converter" that operates using a liquid crystal material. The converter produces a radially or azimuthally polarized beam from a linearly polarized radiation beam. Radially polarized beams are described below.

Lens 26B focuses the tangentially polarized radiation to a spot 30B on surface 28B. Consideration of the electric vectors at spot 30B shows that any given ray incoming to the spot may be paired with another ray having an electric vector that is anti-parallel to the electric vector of the given ray. An exemplary pair of such rays is shown in set "B." Consequently, at spot 30B the electric vectors sum to an electric vector $_B E_R$ that is effectively zero. Away from spot 30B, the electric field component in the xy plane of surface 28B increases.

In set "C" a radial polarizing plate 24, also herein termed a radial polarizer, receives a radiation beam travelling in the negative z direction. Radial polarizer 24 is a second type of inhomogeneous polarizer, having the characteristic that the directions of the electric vectors of radiation exiting the polarizer are along radii of the polarizer, the radii having a common central point 24o in the polarizer. Radial polarizers are known in the art. For example, the "ZPol" polarizer may be oriented relative to the received radiation to generate radial polarization, and the converter produced by Arcoptix may also be configured to generate radial polarization. Other methods for producing radial polarization, such as by using a conical Brewster prism as a reflective element in a laser, are also known in the art.

Lens 26C focuses the radially polarized radiation to a spot 30C on surface 28C. Consideration of the electric vectors at spot 30C shows that any given ray incoming to the spot may be paired with another ray so that the x-components of the electric vectors of the pair are equal in magnitude but opposite in direction. An exemplary pair of such rays is shown in set "C." Consequently, at spot 30C the components of the electric vectors in the xy plane effectively sum to zero, so that at spot 30C there is only a z-component of the electric vector. As for the focused spot of the tangentially polarized radiation, away from focus spot 30C the electric field component in the xy plane of surface 28C increases.

Consideration of the numerical aperture of lenses 26A, 26B, and 26C shows that as the numerical aperture of the lenses increases, for sets A and C the size of the electric vector at the respective focused spot increases. For set A the rate of increase decreases as the numerical aperture increases, since rays from the center of polarizer 20 contribute most to the electric vector. For set C, in contrast, the rate of increase increases as the numerical aperture increases, since rays at the periphery of polarizer 26 contribute most to the electric vector. Changing the numerical aperture of lens 26B does not affect the zero value of the electric vector at spot 30B.

Analysis of the magnetic vectors at spot 30A shows that the resultant magnetic vector from focusing of a radiation beam exiting from linear polarizer 20 is a non-zero magnetic vector in the y-direction. For spot 30B the resultant magnetic vector is a non-zero magnetic vector along the z-direction. For spot 30C the resultant magnetic vector is effectively zero.

Figure 2A:
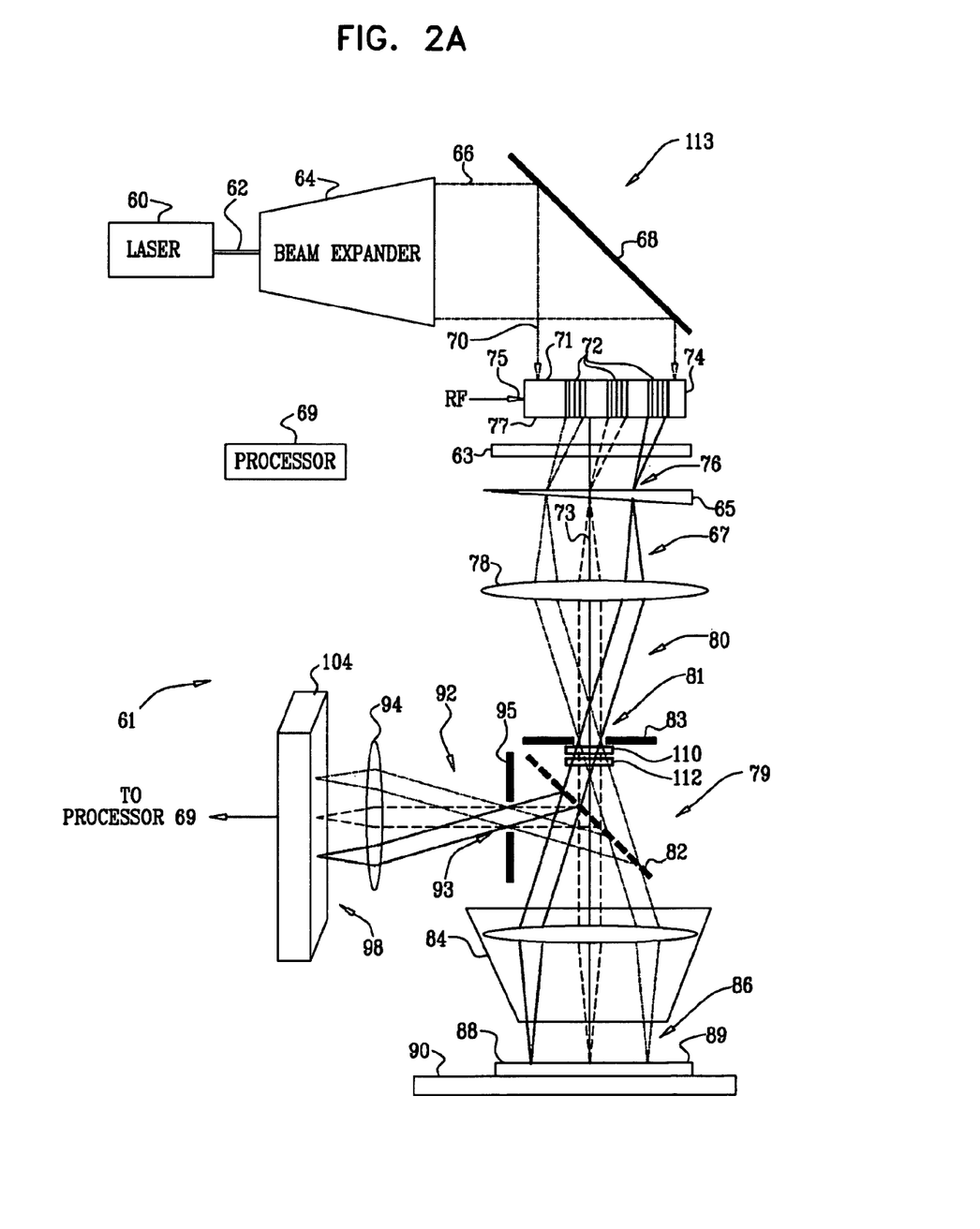
FIG. 2A is a schematic diagram of a side view of a scanning microscope.
Figure 2B:
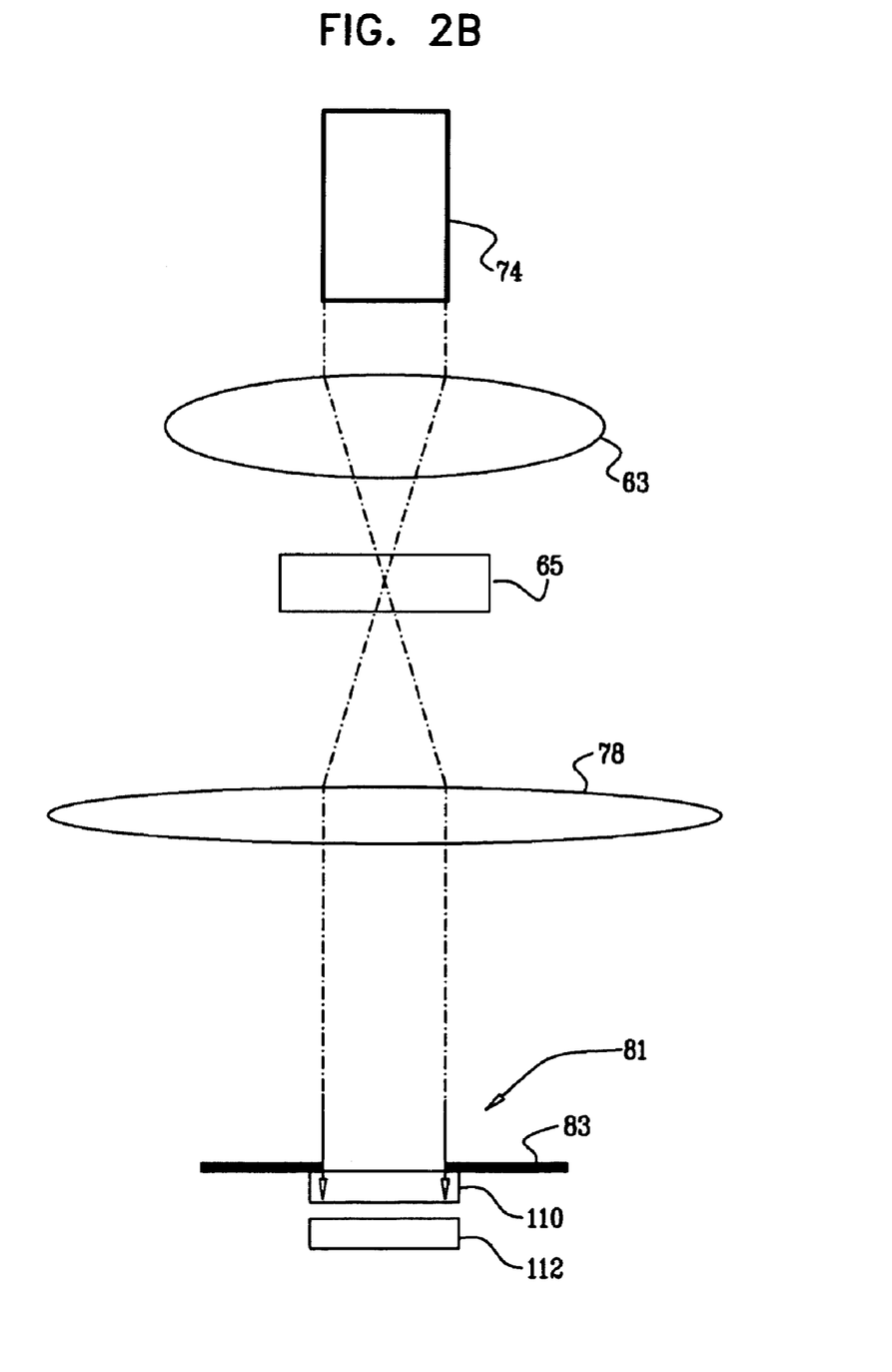
FIG. 2B is a schematic side view of elements of the microscope orthogonal to the view of FIG. 2A, according to an embodiment of the present invention.

FIG. 2A is a schematic diagram of a side view of a scanning microscope 61, and FIG. 2B is a schematic side view of elements of the microscope orthogonal to the view of FIG. 2A, according to an embodiment of the present invention. Microscope 61 comprises a laser 60 which radiates a beam of coherent radiation 62 to a beam expander 64. Typically, laser 60 is selected to emit optical radiation at a wavelength in a region of the electromagnetic spectrum between and including far infra-red and deep ultra-violet (DUV), although it will be understood that the principles of the present invention apply equally to other wavelengths of the spectrum. Beam expander 64 generates an expanded collimated radiation beam 66 which reflects from a plane mirror 68 as a collimated radiation beam 70. Typically, laser 60 is configured to produce linearly polarized radiation, so that beam 70 is linearly polarized. Alternatively, a linear polarizer, for simplicity not shown in FIG. 1, is used to ensure that beam 70 is linearly polarized.

A processor 69 operates elements of scanning microscope 61.

An acousto-optic (AO) element 74 receives linearly polarized, coherent beam 70 at a first surface 71 of the AO element, the first surface acting as a radiation input surface. Processor 69 generates a radio-frequency (RF) signal, with which it drives AO element 74 via an RF input port 75 coupled to the AO element. The RF signal is in the form of variable frequency pulses, or "chirps," each of which generates planar traveling acoustic waves in AO element 74. The AO element is typically oriented so that the direction of the traveling waves is the same as the direction of polarization of incoming beam 70. The planar traveling waves have varying wavelengths corresponding to the variable frequencies of the chirp. The waves act as traveling diffraction gratings 72 having variable spacing, and the gratings operate as cylindrical lenses which focus incoming beam 70, via a second surface 77 of the AO element acting as a radiation output surface. A cylindrical lens 63 focuses the converging beams from element 74 to a series of traveling focused spots 76, which are approximately collinear. A wedge-shaped prism 65, positioned at spots 76, receives the focused beams, and diverts the beams to respective diverging conical beams 67, the axes of each of the conical beams being approximately parallel to an axis 73 of microscope 61. A scanning lens 78 converts diverging beams 67 to a series of linearly polarized collimated beams 80. Collimated beams 80 pass through a pupil 81 and traverse a beam splitter 82 to an objective 84. Optionally, a stop 83 is positioned at pupil 81, the pupil acting as an exit pupil for lens 78, and as an entrance pupil for objective 84. FIG. 2A and FIG. 2B show front and side views of elements 74, 63, 65, 78, and 83, and beam paths through the elements.

Radiation exiting from splitter 82 is focused by objective 84 to a series of traveling spots 86 on a surface 88, the traveling spots typically traveling along an approximately straight line in the surface. In FIG. 2A the approximately straight line along which the points move is in the plane of the paper. Surface 88 is typically the upper surface of a wafer 89 which is being inspected by microscope 61. In some embodiments, but not shown in FIG. 2 for simplicity, there are splitting optics which cause the single line of traveling spots to be split into two or more lines.

Typically, the number of spots 86 on surface 88 at any one time is from approximately three to approximately fifty. However, the number of spots may vary from this range; it will be appreciated that the actual number on the surface at any one time is set by the rate of repetition of the RF chirps, the speed of the traveling waves in AO element 74, and the number of lines into which the line of traveling spots may be split. In one embodiment, there are twelve spots per line, and there are three lines, so that at any one instance there are 36 spots on surface 88.

Radiation scattered from spots 86 is collected by objective 84. Hereinbelow, by way of example, the radiation scattered from spots 86 is assumed to be bright field (BF) radiation, i.e., radiation that is substantially specularly reflected from a cone of radiation illuminating surface 88. However, embodiments of the present invention may be configured to operate, mutatis mutandis, if the returning radiation is gray field (GF) radiation, dark field (DF) radiation, or any combination of BF, GF, and DF radiation. Herein, gray field radiation is assumed to be radiation that makes an angle outside the cone of BF illuminating radiation, and within angles defined by a numerical aperture (NA) of objective 84. Dark field radiation is assumed to be radiation that makes an angle outside the angles defined by the NA of the objective, up to approximately 90° with respect to the normal to surface 88.

The radiation collected by objective 84 traverses generally the same path as the incoming radiation from splitter 82. Objective 84 collimates the collected radiation, and the collimated beams from the objective are diverted by beam splitter 82 as a set of traveling collimated beams 92.

Beams 52 pass through a pupil 93, which is effectively a mirror image of pupil 81, and enter a converging lens 94. Optionally, a stop 95 is placed at pupil 93, which acts as an exit pupil for objective 84 and as an entrance pupil for lens 94. Lens 94 focuses traveling beams 92 to a linear series of substantially circular image spots 98, at the focal plane of lens 94, which are received by a detector 104.

In response, detector 104, typically comprising an array of photo-multiplier tubes (PMTs), generates respective signals according to the intensity of the received radiation. Processor 69 receives the signals and analyzes them to determine characteristics of the regions of surface 88 reflecting or scattering the radiation.

Those with ordinary skill in the art will appreciate that the order of elements described above for microscope 61 is not unique, and that other arrangements of the elements may be made, giving substantially the same results as those described above; such rearrangements may require changes in elements used. For example, in one embodiment of the present invention, splitter 82 is positioned before pupil 81, causing pupil 93 to substantially coincide with pupil 81, so that one of stops 83 or 95 becomes superfluous. Other rearrangements of elements of microscope 61 will be apparent to those skilled in the art, and all such rearrangements are assumed to be included within the scope of the present invention.

An inhomogeneous polarizer plate 110, also herein termed an inhomogeneous polarizer, is positioned at pupil 81. Except as otherwise stated hereinbelow, polarizer 110 is assumed to comprise a radial polarizer having characteristics substantially the same as those of radial polarizer 24 (FIG. 1), and is configured to receive linearly polarized beams 80 and form the beams into radially polarized beams 79.

It will be apparent from the above description that polarizer 110 and AO element 74 form an acousto-optic system 113 that outputs traveling inhomogeneously polarized beams 79.

Optionally, a mask 112 is positioned after polarizer 110. Alternatively, the mask may be positioned at pupil 81 before the inhomogeneous polarizer. Examples of different masks 112, used to partially block the beams passing through polarizer 110, and that may be used in microscope 61, are described below. If polarizer 110 is positioned as described above for the second configuration, mask 112 may also be positioned before or after the polarizer.

The configuration of beams 79 into radially polarized beams causes the electric vector at the center of each spot 86 to be substantially perpendicular to surface 88, as described above with respect to FIG. 1, set "C." This is in contrast to the situation found for linear polarizers, such as polarizer 20, wherein the electric vector at the spot center is parallel to surface 88. As is exemplified below, by orienting the electric vector at the spot center to be perpendicular to surface 88, features of the surface which are not apparent, or are only weakly apparent, on examination with non-polarized or linearly polarized radiation, may be enhanced by examination with radially polarized radiation.

Figure 3:
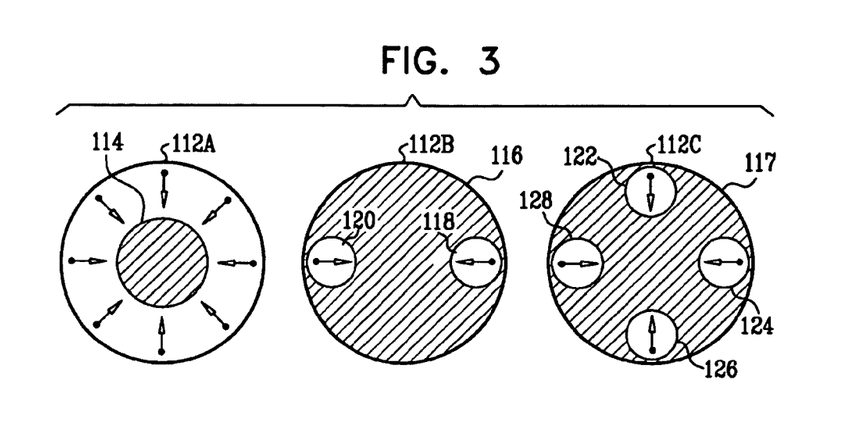
FIG. 3 shows different masks that may be used in the microscope, according to an embodiment of the present invention.

FIG. 3 shows different masks 112 that may be used in microscope 61, according to an embodiment of the present invention. In the following description, different masks 112 are differentiated using a letter A, B, C, . . . as a suffix. Positioning one of the masks, as described above, reduces the radiation from the full aperture radiation provided by polarizer 110.

A mask 112A is an annular mask. Consideration of set "C" (FIG. 1) shows that radiation through the periphery of polarizer 22 has a greater effect in forming the resulting vector at spot 30C than radiation through the center of the polarizer. Mask 112A uses this property, by having a central stop 114 in the mask. Typically central stop 114 has an area that is 50% or greater than the overall area of mask 112A. Alternatively, dimensions of central stop 114 may be chosen to satisfy an energy criterion for the resulting beam, for example that the energy of the resulting beams 79 is 50% that of incoming beams 80. Central stop 114 causes beams 80, that were "solid" beams before the mask, to be converted to cylindrical beams 79 after the mask.

A mask 112B is a dipole mask, comprising a stop 116 having two, typically circular, openings 118, 120 at the periphery of the mask. The two openings are typically symmetrically positioned with respect to a center of the mask, and allow radiation to penetrate the periphery. Mask 112B thus converts the solid beams before the mask to two converging peripheral beams 79 after the mask.

A mask 112C is a quadrupole mask, comprising a stop 117 having four, typically circular, openings 122, 124, 126, 128 at the periphery of the mask. The four openings are typically symmetrically positioned with respect to the mask center, and allow radiation to penetrate the periphery. Mask 112C thus converts the solid beams before the mask to four converging peripheral beams 79 after the mask.

Using masks such as masks 112B and 112C allows embodiments of the present invention to irradiate regions on surface 88 from complementary angles, and to receive scattered or reflected radiation caused by the irradiation at these complementary angles. The complementary angles defined by the masks may typically make relatively large angles with a normal to surface 88. The inventors believe that in some embodiments, the openings of mask 112B or 112C may be oriented to conform with the directionality of elements on surface 88, so as to increase the signal generated by the elements.

Although not shown in FIG. 3, those having ordinary skill in the art will understand that masks 112 other than those described above may be used in microscope 61. Such other masks include, but are not limited to, hexapole and octopole masks.

Figure 4:
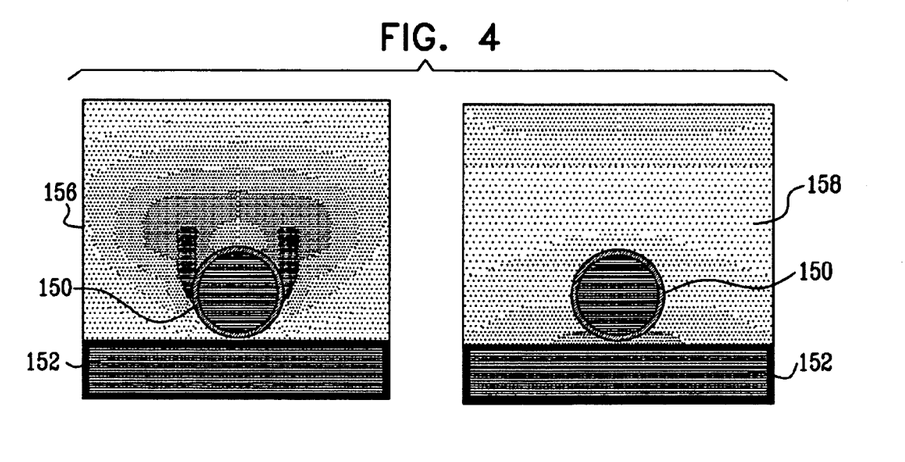
FIG. 4 shows schematic cross-sectional diagrams of a sphere on a surface, according to an embodiment of the present invention.
Figure 5:
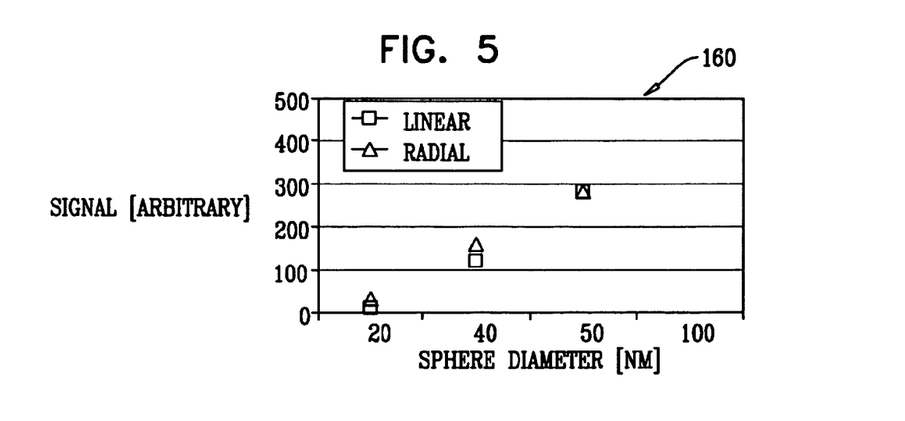
FIG. 5 is a graph of results of simulations for the sphere-surface combination of FIG. 4, according to an embodiment of the present invention.

FIG. 4 shows schematic cross-sectional diagrams of a sphere 150 on a surface 152, and FIG. 5 is a graph 160 of results of simulations for the sphere-surface combination, according to an embodiment of the present invention. Sphere 150 simulates a protuberance from surface 152. The inventors have simulated signals generated from different size spheres 150, assumed to be formed of silicon dioxide ($SiO_2$) resting on surface 152, assumed to comprise undoped mono-crystalline silicon. The combination of sphere 150 on surface 152 is herein also referred to as combination 154. The simulations generated the near field electric field distribution formed by combination 154 under irradiation by apparatus 61 at a wavelength of 266 nm, assuming the numerical aperture (NA) of the objective optics is 0.67, and the collection optics is annular, having an NA between 0.67 and 0.9, corresponding to gray field collection. A diagram 156 shows the relative magnitude of the intensity of the near field electric fields generated for a first simulation assuming irradiation using linear polarization, as generated using a linear polarizer such as polarizer 20 (FIG. 1). A diagram 158 shows the relative intensity magnitude of the near field electric fields generated for a second simulation assuming irradiation using radial polarization, as generated using a radial polarizer such as polarizer 24. In diagrams 156 and 158, and in the other near field electric field diagrams of this application, more intense electric fields are shown as regions of the diagram having higher densities of dots. Diagrams 156 and 158 show that the near fields for the two types of irradiation are very different. Both diagrams of the fields are for a sphere of diameter 50 nm.

From the near field distributions, the inventors generated expected signals from the combination.

Graph 160 shows the expected signals generated at detector 104 (FIG. 2A) using the two types of polarization. The graph plots the expected signal generated at the detector, in arbitrary units, for different diameters of sphere 150. The expected signals are calculated as differences compared with a reference structure having no sphere. As shown in the graph, for spheres of diameters 20 nm and 40 nm, the expected signal generated by the radially polarized radiation is larger than the expected signal generated by the linearly polarized radiation.

Figure 6:
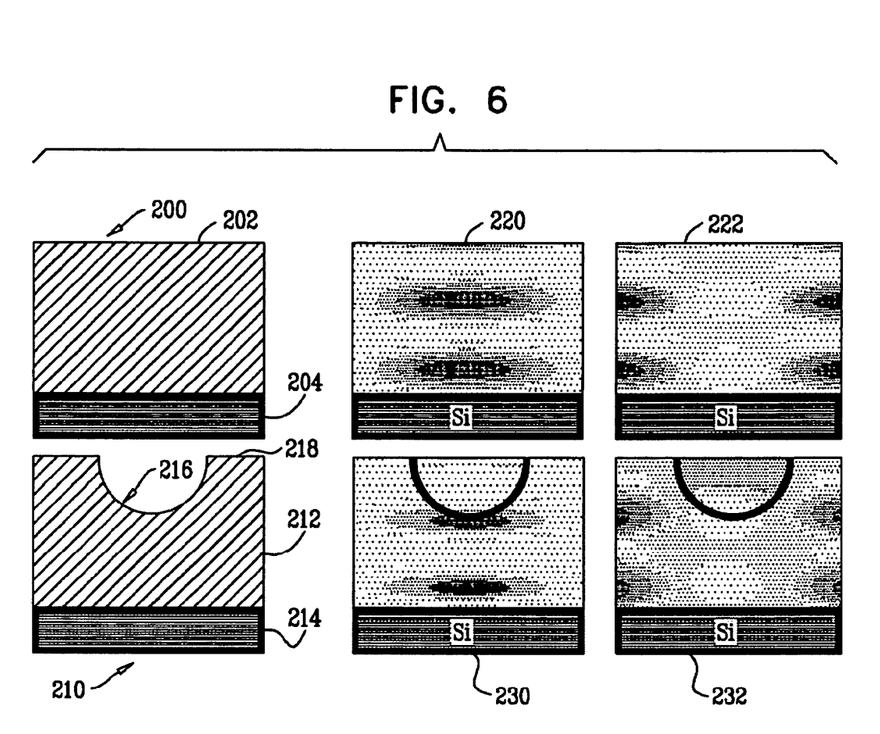
FIG. 6 shows schematic cross-sectional diagrams of different structures, according to an embodiment of the present invention.

FIG. 6 shows schematic cross-sectional diagrams of different structures, according to an embodiment of the present invention. A first structure 200 is of a silicon dioxide layer 202 overlaying an undoped mono-crystalline silicon substrate 204. A second structure 210 is of a silicon dioxide layer 212 overlaying an undoped mono-crystalline silicon substrate 214. In the second structure, an open void 216, in the form of a hemisphere, is formed on an upper surface 218 of layer 212. Void 216 simulates an indentation in surface 218. The inventors have made simulations of the near field electric fields generated by irradiation of each structure at a wavelength of 266 nm, assuming the same NAs for the objective and collection optics as described above with respect to FIG. 5.

Diagram 220 shows the near field electric field for structure 200 for irradiation with linearly polarized radiation, and diagram 222 shows the near field electric field for structure 200 for irradiation with radially polarized radiation. Structure 200 acts as a reference structure for the two types of irradiation.

Diagram 230 shows the near field electric field for structure 210 for irradiation with linearly polarized radiation, and diagram 232 shows the near field electric field for the structure for irradiation with radially polarized radiation. As is seen in the diagrams, under radially polarized irradiation void 216 introduces a larger perturbation in the field compared to the perturbation introduced under linear polarization.

From the simulated fields, the inventors determined differential signals, referred to the reference structures. The signals were assumed to be generated by detector 104, and were measured in arbitrary units. The signal produced under linearly polarized irradiation was 500 units, the signal produced under radially polarized irradiation was 740 units.

Figure 7:
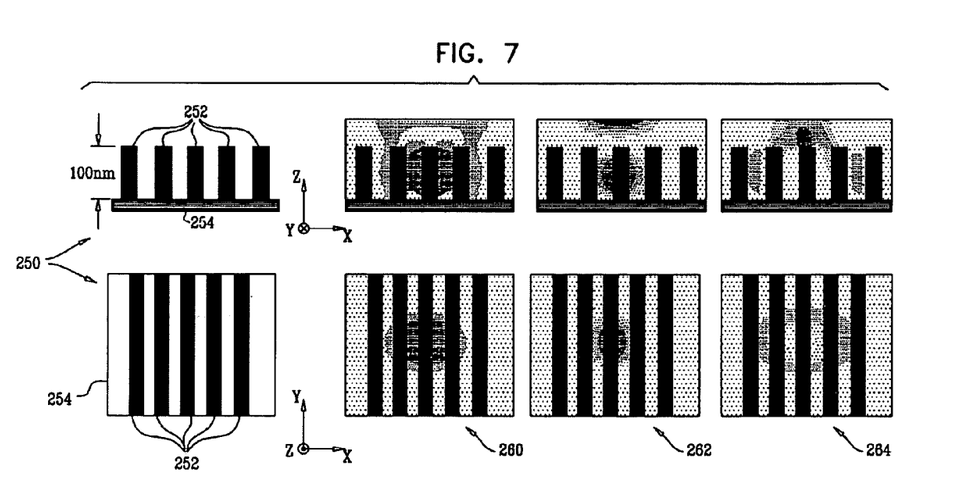
FIG. 7 shows schematic cross-sectional diagrams of a periodic structure, according to an embodiment of the present invention.

FIG. 7 shows schematic cross-sectional diagrams of a periodic structure 250, according to an embodiment of the present invention. Structure 250 comprises a sequence of silicon dioxide lines 252 on a mono-crystalline silicon substrate 254. Lines 252 have a width of 50 nm, and the gap between adjacent lines is 50 nm. The inventors have simulated irradiating structure 250 with three types of polarized radiation: linearly polarized radiation that is perpendicular to lines 252, linearly polarized radiation that is parallel to lines 252, and radially polarized radiation.

Three sets of diagrams 260, 262, and 264 respectively show the simulated electric field for the perpendicular linearly polarized radiation, the parallel linearly polarized radiation, and the radially polarized radiation. Each set of diagrams shows a cross-sectional view of the electric field, and a top view of the electric field. The top view of the electric field shows the electric field at 50 nm above the surface of substrate 254.

Inspection of the diagrams shows that for both types of linearly polarized radiation, the radiation penetrates into structure 250. In contrast, for the radially polarized radiation, the radiation does not penetrate into the center of the structure. Rather, at the center of the structure, the magnitude of the electric vector is large at the upper surface of lines 252 and has only a component $E_z$ in the z direction, since at the center the component $E_x$ in the x direction vanishes. At positions other than the center, i.e., in non-symmetric regions, $E_x$ is not zero. Thus, radial polarization and linear polarization may be used to induce different light-matter interactions and scattering from the same structure in a controlled manner, thereby providing new information on the structure.

Figure 8:
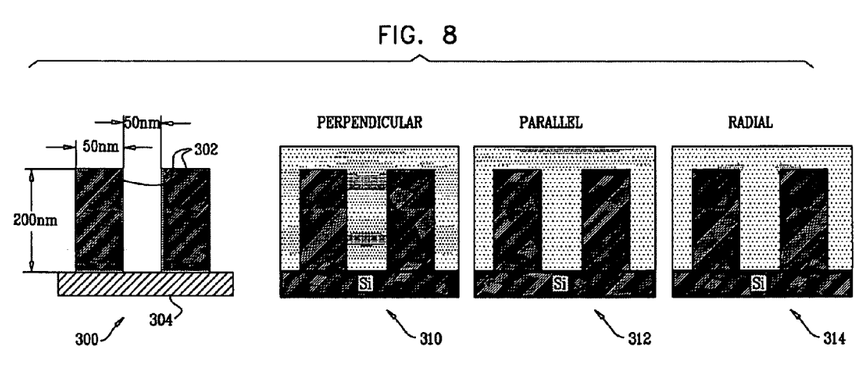
FIG. 8 shows schematic cross-sectional diagrams of another periodic structure, according to an embodiment of the present invention.

FIG. 8 shows schematic cross-sectional diagrams of a structure 300, according to an embodiment of the present invention. Structure 300 comprises polycrystalline undoped silicon parallel lines 302 deposited on a mono-crystalline undoped silicon substrate 304. Lines 302 have a height of 200 nm and a width of 50 nm, and there is a separation of 50 nm between the lines.

Diagrams 310, 312, and 314 respectively show simulated electric fields for radiation that is linearly polarized perpendicular to lines 302, linearly polarized parallel to the lines, and radially polarized. DUV radiation will penetrate into the space between the silicon lines if the line/space ratio is large compared with the wavelength of the DUV. If the line/space ratio is smaller than the wavelength, the DUV will penetrate, while being attenuated for perpendicular polarization. The diagrams show that while there is some penetration to the silicon substrate for perpendicular linearly polarized radiation, there is no penetration between the poly-crystalline lines for either parallel linearly polarized radiation, or for radially polarized radiation. Thus, using radially polarized radiation allows inspection of the upper surface of lines 302, regardless of the direction of the lines, whereas if linearly polarized radiation is used the direction of the lines affects the electric field generated at the lines, and so influences the returning radiation and the detected signal.

Figure 9:
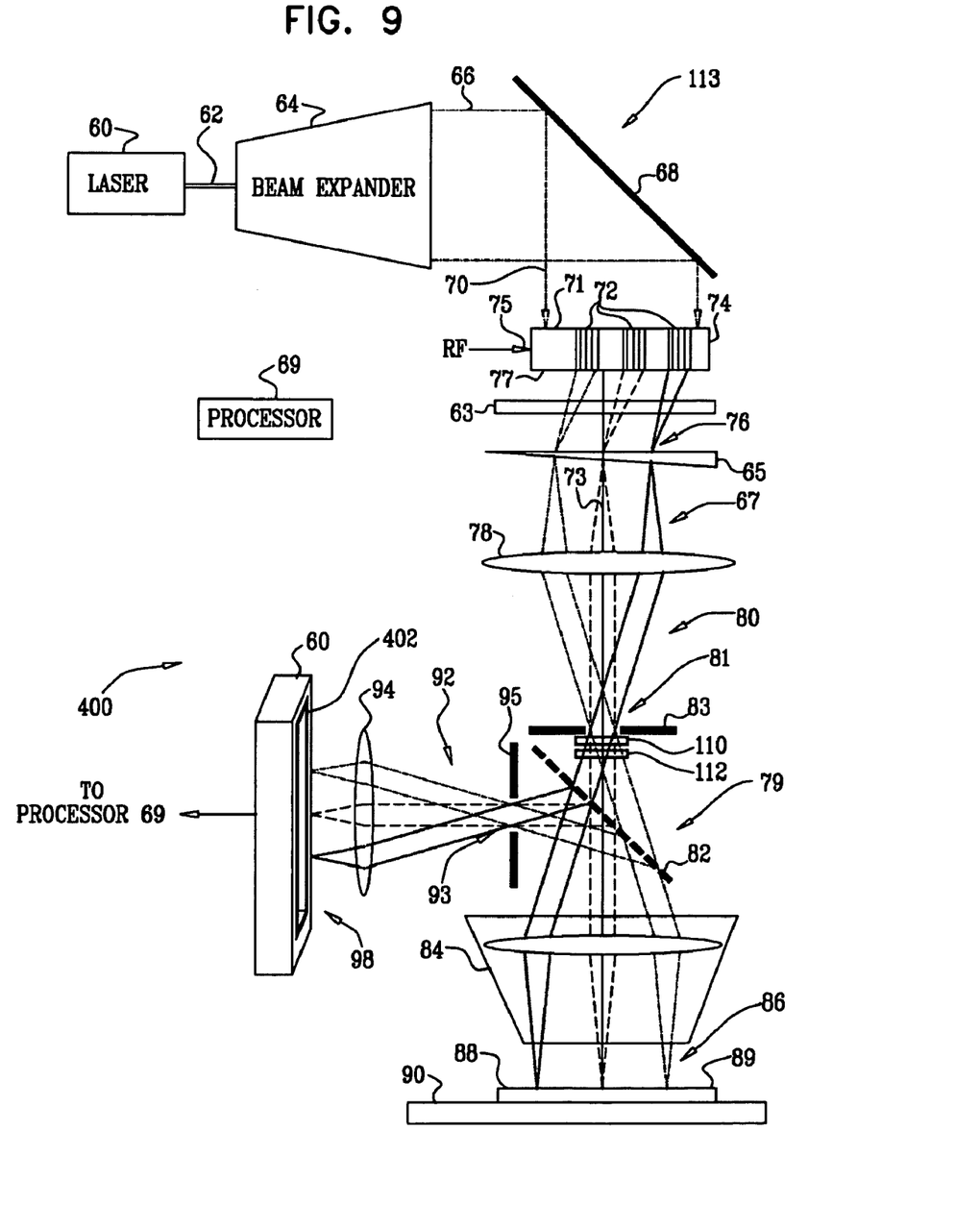
FIG. 9 is a schematic diagram of an alternative scanning microscope, according to an embodiment of the present invention.
Figure 10:
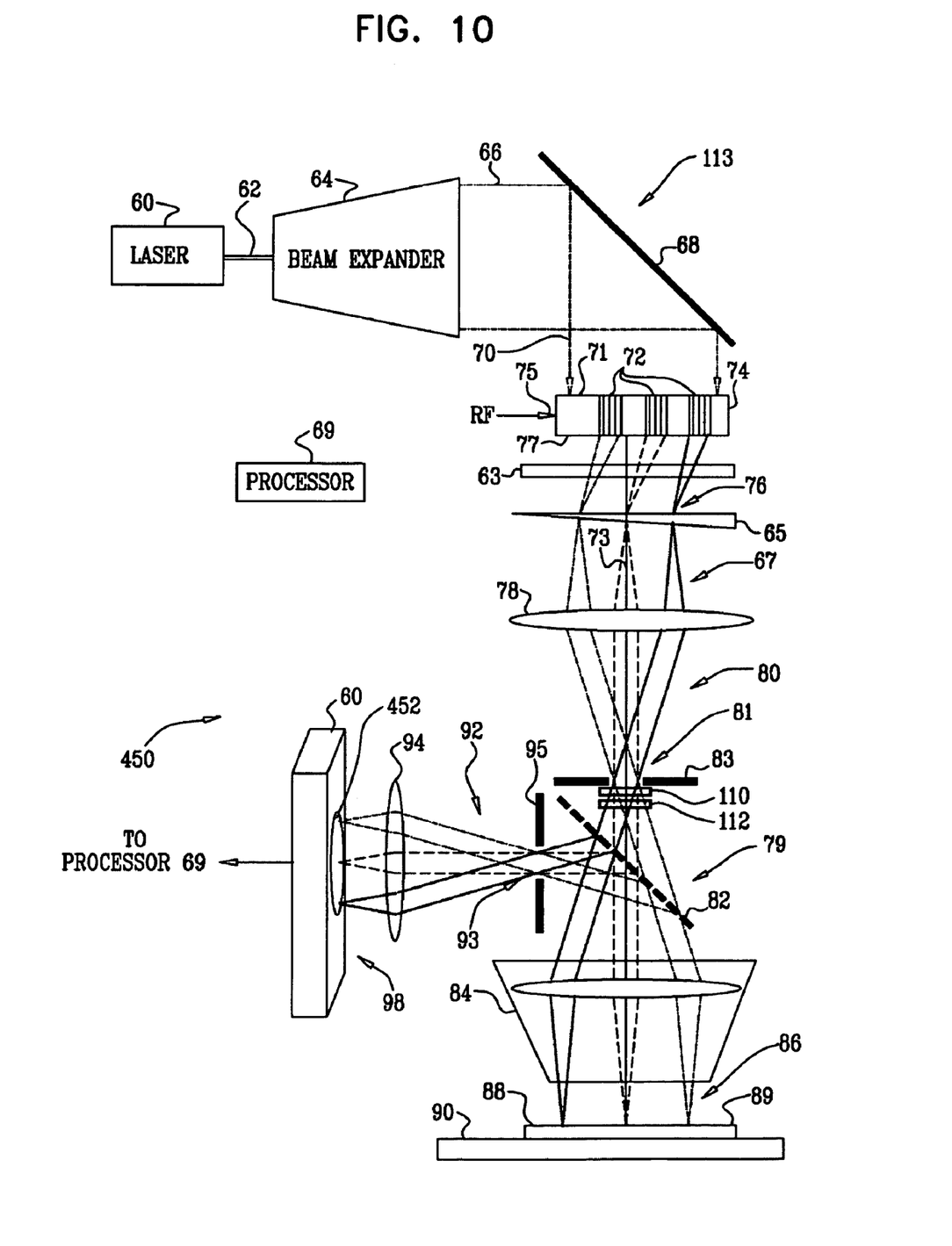
FIG. 10 is a schematic diagram of a further alternative scanning microscope, according to an embodiment of the present invention.

FIGS. 9 and 10 are schematic diagrams of alternative scanning microscopes 400 and 450, according to embodiments of the present invention. Apart from the differences described below, the operation of microscopes 400 and 450 is generally similar to that of microscope 61 (FIGS. 2A and 2B), and elements indicated by the same reference numerals in microscopes 61, 400, and 450 are generally similar in construction and in operation. Microscope 400 is configured to generate one line of travelling beams.

Microscope 400 (FIG. 9) is constructed as a confocal microscope by positioning a one-dimensional slit 402 before detector 104, at the focal plane of beams 92. The slit is positioned so that it is along the line followed by the image spots. It will be understood that if the microscope is configured to generate multiple lines of travelling beams, corresponding multiple one-dimensional slits are placed before detector 104.

In microscope 450 (FIG. 10), a polarizing element 452, acting as an analyzer, is positioned before detector 104. The radiation incident on surface 88 is radially polarized. However, the radiation from the surface typically has different polarization characteristics compared with those of the incident radiation, and typically the radiation from the surface has some polarization, i.e., it is not unpolarized. The polarization of the radiation from the surface is typically a function of the physical structure of the surface and the optical constants of the material of the surface. Orientation of polarizing element 452, typically a linear polarizer, allows the polarization structure of the returning radiation to be determined, and thus information as to the physical and/or material properties of the region of surface 88 reflecting or scattering the radiation.

The description above has illustrated how microscopes 61, 400, and 450 may be used with an inhomogeneous polarizer 110 having characteristics that are substantially the same as those of radial polarizer 24. As explained above, the radial polarization produced generates an electric vector that is substantially normal to surface 88 at the center of a spot that is focused onto the surface. The differences in magnitude and direction of the electric vector, compared to the magnitude and direction of the electric vector if linear polarization is used, leads to the differences in electric fields at surface 88, as exemplified in the simulations of the electric fields shown in FIGS. 4, 6, 7, and 8. The simulations therein are generated using optical properties of the materials being simulated, and it is the interaction of the electric vector of the irradiating radiation with the materials and structures that results in the reflected or scattered radiation from the structures.

While embodiments described above have assumed reflection systems, wherein incident beams reflect or scatter from a surface being examined, those having ordinary skill in the art will appreciate that the scope of the present invention includes transmission systems, such as may be appropriate for examination of a transparent object, for example a reticle. For example, microscope 61 (FIGS. 2A and 2B) may be converted to a transmission system by duplicating objective optics 84. The transmission system is formed by positioning the duplicated objective optics after the object, and repositioning lens 94 and detector 104 after the object, so that the duplicated optics, lens 94, and detector 104 are on axis 73.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. An apparatus for imaging a surface, comprising:
    an acousto-optic (AO) system, comprising:
        an AO element, having a radiation input surface and a radiation output surface, which is configured to receive a series of radio-frequency (RF) pulses and a radiation input at the radiation input surface and to generate in response thereto traveling beams from the radiation output surface;
        a lens positioned to receive the traveling beams; and
        an inhomogeneous polarization generator, positioned at an exit pupil of the lens so that the AO system outputs traveling inhomogeneously polarized beams;
    objective optics which are configured to focus the inhomogeneously polarized beams onto the surface so as to form respective traveling spots thereon;
    collection optics, which are configured to collect scattered radiation from the traveling spots and to focus the scattered radiation to form respective image spots; and
    a detector which is arranged to receive the respective image spots and to generate a signal in response thereto.

2. The apparatus according to claim 1, wherein the inhomogeneous polarization generator comprises an inhomogeneous polarizing plate located after the AO element.

3. The apparatus according to claim 1, wherein the inhomogeneous polarization generator generates the inhomogeneously polarized beams as radially polarized beams having radially directed electric vectors.

4. The apparatus according to claim 1, further comprising a mask positioned in relation to the inhomogeneous polarization generator so as to partially block the inhomogeneously polarized beams.

5. The apparatus according to claim 4, wherein the mask comprises one of an annular mask blocking a central portion of the inhomogeneously polarized beams, a dipole mask allowing two inhomogeneously polarized sub-beams to exit the mask, and a quadrupole mask allowing four inhomogeneously polarized sub-beams to exit the mask.

6. The apparatus according to claim 1, wherein the respective image spots travel along a line, the apparatus further comprising a confocal slit positioned along the line.

7. The apparatus according to claim 1, further comprising an analyzing polarizer positioned before the detector.

8. The apparatus according to claim 1, wherein the surface comprises a protuberance therefrom, and wherein the AO system is configured to output the inhomogeneously polarized beams at a given wavelength so that the signal is greater than a linearly-polarized signal produced by linearly polarized beams focused on the protuberance at the given wavelength.

9. The apparatus according to claim 1, wherein the surface comprises an indentation therein, and wherein the AO system is configured to output the inhomogeneously polarized beams at a given wavelength so that the signal is different from a linearly-polarized signal produced by linearly polarized beams focused on the indentation at the given wavelength.

10. The apparatus according to claim 1, wherein the surface comprises periodic parallel lines above the surface, and wherein the AO system is configured to output the inhomogeneously polarized beams at a given wavelength so that the signal is different from a linearly-polarized signal produced by linearly polarized beams focused on the periodic parallel lines at the given wavelength.

11. The apparatus according to claim 10, wherein the surface comprises an upper surface of the periodic parallel lines, and wherein the objective optics are configured to focus the inhomogeneously polarized beams onto the upper surface.

12. The apparatus according to claim 1, wherein the scattered radiation comprises at least one of bright field radiation, gray field radiation, and dark field radiation.

13. A method for imaging a surface, comprising:
configuring an acousto-optic (AO) system to have an AO element and an inhomogeneous polarization generator;
configuring the AO element to have a radiation input surface and a radiation output surface, and to receive a series of radio-frequency (RF) pulses and a radiation input at the radiation input surface and to generate in response thereto traveling beams from the radiation output surface;
positioning a lens to receive the traveling beams;
positioning the inhomogeneous polarization generator at an exit pupil of the lens so that the AO system outputs traveling inhomogeneously polarized beams;
focusing the inhomogeneously polarized beams onto the surface so as to form respective traveling spots thereon;
collecting scattered radiation from the traveling spots and focusing the scattered radiation to form respective image spots; and
receiving the respective image spots in a detector and generating a signal in response thereto.

14. The method according to claim 13, wherein the inhomogeneous polarization generator comprises an inhomogeneous polarizing plate, the method further comprising locating the inhomogeneous polarizing plate after the AO element.

15. The method according to claim 13, further comprising generating the inhomogeneously polarized beams as radially polarized beams having radially directed electric vectors.

16. The method according to claim 13, further comprising positioning a mask in relation to the inhomogeneous polarization generator so as to partially block the inhomogeneously polarized beams.

17. The method according to claim 13, wherein the respective image spots travel along a line, the method further comprising positioning a confocal slit along the line.

18. The method according to claim 13, further comprising positioning an analyzing polarizer before the detector.

19. The method according to claim 13, wherein the surface comprises a protuberance therefrom, the method further comprising configuring the AO system to output the inhomogeneously polarized beams at a given wavelength so that the signal is greater than a linearly-polarized signal produced by linearly polarized beams focused on the protuberance at the given wavelength.

20. The method according to claim 13, wherein the surface comprises an indentation therein, the method further comprising configuring the AO system to output the inhomogeneously polarized beams at a given wavelength so that the signal is different from a linearly-polarized signal produced by linearly polarized beams focused on the indentation at the given wavelength.

21. The method according to claim 13, wherein the surface comprises periodic parallel lines above the surface, the method further comprising configuring the AO system to output the inhomogeneously polarized beams at a given wavelength so that the signal is different from a linearly-polarized signal produced by linearly polarized beams focused on the periodic parallel lines at the given wavelength.

22. The method according to claim 13, wherein the scattered radiation comprises at least one of bright field radiation, gray field radiation, and dark field radiation.

* * * * *